US012419292B2

United States Patent
Umezawa

(10) Patent No.: US 12,419,292 B2
(45) Date of Patent: Sep. 23, 2025

(54) FISHING REEL

(71) Applicant: GLOBERIDE, Inc., Tokyo (JP)

(72) Inventor: Yuichi Umezawa, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 171 days.

(21) Appl. No.: 18/238,320

(22) Filed: Aug. 25, 2023

(65) Prior Publication Data

US 2024/0130344 A1 Apr. 25, 2024
US 2024/0224969 A9 Jul. 11, 2024

(30) Foreign Application Priority Data

Oct. 19, 2022 (JP) ................................ 2022-167304

(51) Int. Cl.
*A01K 89/01* (2006.01)
*A01K 89/015* (2006.01)

(52) U.S. Cl.
CPC .. *A01K 89/01912* (2015.05); *A01K 89/01085* (2015.05)

(58) Field of Classification Search
CPC ...... A01K 89/019125; A01K 89/01917; A01K 89/01918
See application file for complete search history.

(56) References Cited

U.S. PATENT DOCUMENTS

| 2,160,175 | A | * | 5/1939 | Shakespeare, Jr. | ........................ A01K 89/01917 242/279 |
| 2014/0183292 | A1 | | 7/2014 | Kaneko et al. | |
| 2015/0150229 | A1 | * | 6/2015 | Umezawa | ........ A01K 89/01918 242/258 |
| 2015/0189865 | A1 | | 7/2015 | Umezawa et al. | |
| 2015/0201597 | A1 | * | 7/2015 | Ikebukuro | ........ A01K 89/01143 242/274 |

FOREIGN PATENT DOCUMENTS

| CN | 103857285 B | | 1/2016 | |
| CN | 104717882 B | | 6/2017 | |
| JP | 06189655 A | * | 7/1994 | ....... A01K 89/01917 |
| JP | 2009207369 A | * | 9/2009 | |
| JP | 2014000045 A | | 1/2014 | |
| WO | WO-2014084090 A1 | * | 6/2014 | ........... A01K 89/015 |

OTHER PUBLICATIONS

Jul. 12, 2024 Office Action issued in Taiwanese Patent Application No. 112135422.
Steez LTD SV TW; "Daiwa Fishing Tackle"; 2022; pp. 44-48; (18 pages).

* cited by examiner

*Primary Examiner* — Emmanuel M Marcelo
(74) *Attorney, Agent, or Firm* — Oliff PLC

(57) ABSTRACT

A fishing reel comprises a level wind device that evenly winds a fishing line around a spool rotatably supported between left and right side plates of a reel main body. The level wind device comprises a fishing line guide body through which a fishing line is inserted, and a rib that is provided in the fishing line guide body and prevents line entanglement, and the O-ring is disposed in the cylindrical portion so as to fill a gap between the rib and an opposing portion opposing the rib of the cylindrical portion of the level wind device. The rib has a shape for sliding the fishing line in contact with the cylindrical portion.

7 Claims, 12 Drawing Sheets

FISHING REEL

CROSS-REFERENCE TO RELATED APPLICATION

This application claims priority under 35 U.S.C. § 119 to Japanese Patent Application No. 2022-167304 filed on Oct. 19, 2022 in the Japanese Patent Office, the entire contents of each hereby incorporated by reference.

FIELD

The present disclosure relates to a fishing reel comprising a fishing line guide body that winds and guides a fishing line around a spool between side plates in front of the spool.

BACKGROUND

Conventionally, in a double bearing type fishing reel, a level wind device is disposed so as to evenly wind a fishing line around a spool rotatably supported between left and right side plates. The level wind device includes a fishing line guide body that reciprocates left and right in front of the spool in conjunction with a winding operation of a handle rotatably arranged on one side plate side, and the fishing line can be evenly wound around the spool by inserting the fishing line into the fishing line guide body.

A configuration is known in which the above-described fishing line guide body includes an opening in which an opening region is formed wide so as to reduce resistance at the time of releasing the fishing line and a narrow portion that guides the fishing line at the time of winding the fishing line, and the fishing line guide body is turned in conjunction with a switching operation of a clutch (e.g., JP 2014-45 A). In such a configuration, since the opening is located in front of the spool when the clutch is turned OFF, the fishing line wound around the spool during the casting operation does not receive a large resistance from the inner surface of the opening of the fishing line guide body, and stable casting can be performed while suppressing a decrease in the flying distance of a tackle. In addition, when the clutch is returned to ON, the narrow guide portion is located in front of the spool, so that the fishing line can be evenly wound around the spool.

The fishing line guide body described above is attached to a holding portion that is movable in the axial direction (left-right direction) and integrally turns together with a tubular body with respect to the tubular body that turns in conjunction with the clutch operation. The holding portion is provided with an engagement pin that engages with a spiral groove of a worm shaft disposed in the tubular body, and when the worm shaft is rotationally driven, the fishing line guide body is movable in the axial direction by an engagement relationship between the spiral groove and the engagement pin.

In addition, in the double bearing type reel having the configuration described above, it is preferable to have a structure in which the fishing line does not entangle with the portion of the fishing line guide body. For example, the applicant of the present application manufactures a double bearing type reel in which the fishing line is less likely to be entangled in the vicinity of the fishing line guide body by providing a rib for preventing line entanglement in the fishing line guide body (see DAIWA FISHING TACKLE 2022, pgs. 44 to 48).

SUMMARY

In the double bearing type reel described above, since the rib is formed in the fishing line guide body, the fishing line in contact with the surface (front end surface) of the rib can be released to suppress entanglement of the fishing line, but there is a gap between the lower surface of the rib and the cylindrical portion holding the engagement pin of the level wind device, and this gap is not taken into consideration. That is, when a line trouble such as backlash occurs in a case where a thin fishing line is used, a loop may be formed in the fishing line, or twists may occur, and the line may enter the gap described above causing entanglement, so that the line trouble cannot be easily resolved.

The present disclosure has been contrived in view of the above problems, and an object of the present disclosure is to provide a fishing reel comprising a level wind device having a structure in which line entanglement is less likely to occur at a periphery of a rib provided on a fishing line guide body.

In order to achieve the above object, a fishing reel according to the present disclosure comprises a level wind device that evenly winds a fishing line around a spool rotatably supported between left and right side plates of a reel main body, where the level wind device comprises a fishing line guide body through which the fishing line is inserted and a rib that is provided in the fishing line guide body and prevents line entanglement; an O-ring is disposed at a front end portion of the level wind device so as to fill a gap between the rib and an opposing portion opposing the rib at the front end portion, and the rib has a shape that slides the fishing line in contact with the front end portion.

According to the fishing reel having the configuration described above, since the rib is formed in the fishing line guide body through which the fishing line is inserted, and the O-ring is disposed at the front end portion so as to fill the gap between the rib and the opposing portion opposing the rib of the front end portion of the level wind device, the fishing line is prevented from entering the gap, and the line entanglement is effectively prevented. In addition, since the rib has a shape for sliding the fishing line in contact with the front end portion thereof, the line entanglement is effectively prevented even at the rib portion.

According to the present disclosure, a fishing reel comprising a level wind device having a structure in which line entanglement is less likely to occur is obtained at a periphery of a rib provided on a fishing line guide body.

BRIEF DESCRIPTION OF THE DRAWINGS

FIG. 4A is a view illustrating a conventional structure, and FIG. 4B is a view illustrating a structure of the present embodiment;

FIG. 5A is a view illustrating a conventional structure, and FIG. 5B is a view illustrating a structure of the present embodiment;

FIG. 6A is a view illustrating a conventional structure, and FIG. 6B is a view illustrating a structure of the present embodiment; FIG. 7A is a view illustrating a conventional structure, and FIG. 7B is a view illustrating a structure of the present embodiment.

DETAILED DESCRIPTION

Hereinafter, a fishing reel according to the present disclosure will be described with reference to the drawings.

Note that in the following description, the front-back direction (front side, back side), left-right direction, up-down direction (upper side, lower side) are defined as directions illustrated in FIG. 1.

Figure 1:
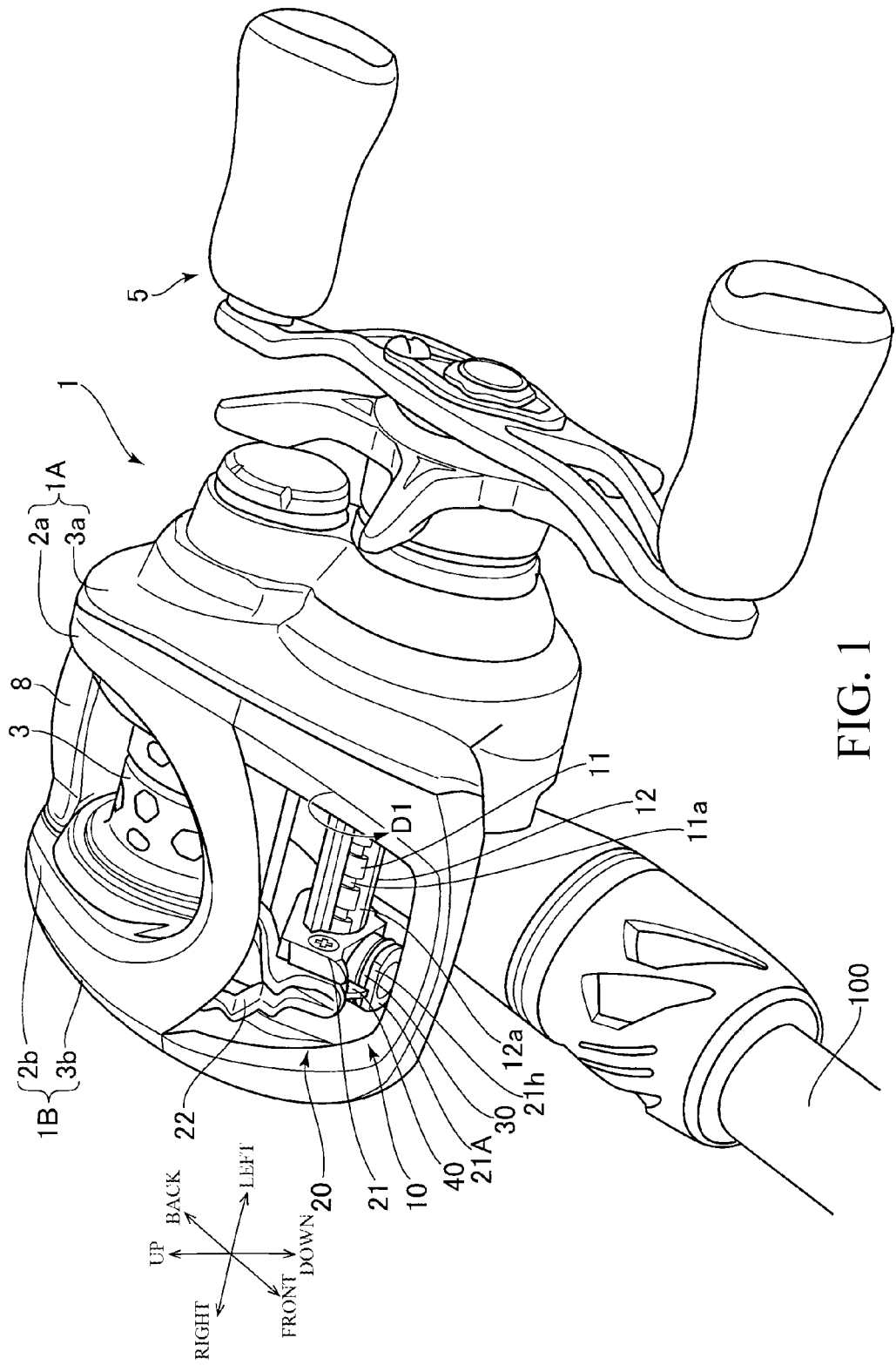
FIG. 1 is a perspective view illustrating an embodiment of a fishing reel according to the present disclosure as viewed from a front side.

As illustrated in FIG. 1, the fishing reel according to the present embodiment comprises a reel body 1 having left and right side plates 1A and 1B in which left and right frames 2a and 2b are covered with left and right covers 3a and 3b, respectively. In the reel body 1, reel legs located between the left and right side plates and attached to a fishing rod 100 are integrally formed. A spool shaft is rotatably supported between the left and right frames 2a and 2b by way of a bearing, and a spool 3, around which a fishing line is wound, is integrally fixed to the spool shaft.

In the present embodiment, a handle 5 that rotationally drives the spool 3 is installed on the left side plate 1A side, and a known power transmission mechanism that transmits a rotational driving force of the handle 5 to the spool shaft is disposed in a space between the left frame 2b and the left cover 3b. A known clutch mechanism that switches the spool shaft between the power transmitting state and the power shielding state is disposed on one of the side plates, and the clutch mechanism switches from the clutch ON state (power transmitting state) to the OFF state (power interrupting state) by pushing down a clutch lever 8 disposed between the left and right side plates on the back side of the spool 3. The return from the clutch-OFF state to the clutch-ON state can be performed by rotationally operating the handle 5 by a known automatic return mechanism.

A level wind device 10 is disposed on the front side of the spool 3 between the left and right side plates 1A and 1B.

The level wind device 10 comprises a fishing line guide body 20 through which the fishing line wound around the spool 3 is inserted, a screw shaft (worm shaft) 11 rotationally driven through the driving force transmission mechanism, and a rib 40 provided in the fishing line guide body 20, and is configured to be reciprocally driven to the left and right when the fishing line guide body 20 is engaged with the screw shaft 11.

The screw shaft 11 is accommodated in a tubular body (cylindrical body) 12 turnably held between the left and right side plates, and a long hole 12a extending in the axial direction is formed in an outer surface of the tubular body 12. A spiral groove 11a is formed on the surface of the screw shaft 11, and the spiral groove is exposed through the long hole 12a. In addition, the fishing line guide body 20 through which the fishing line is inserted comprises a holding portion (main body) 21 integrally formed of resin or the like, and a fishing line inserting portion 22 integrally fixed to an upper part of the holding portion 21 and through which the fishing line is actually inserted, where the holding portion 21 has a through-hole 21a formed in the left-right direction, and it is arranged and formed so as to surround the tubular body 12.

The tubular body 12 is turnably driven by a predetermined angle in accordance with the operation of the clutch lever 8 of the clutch mechanism. Specifically, when the clutch lever 8 is pushed down from the clutch-ON state illustrated in FIG. 1 to the clutch-OFF state, the tubular body 12 is turnably driven to the near side (direction of arrow D1).

Figure 3A:
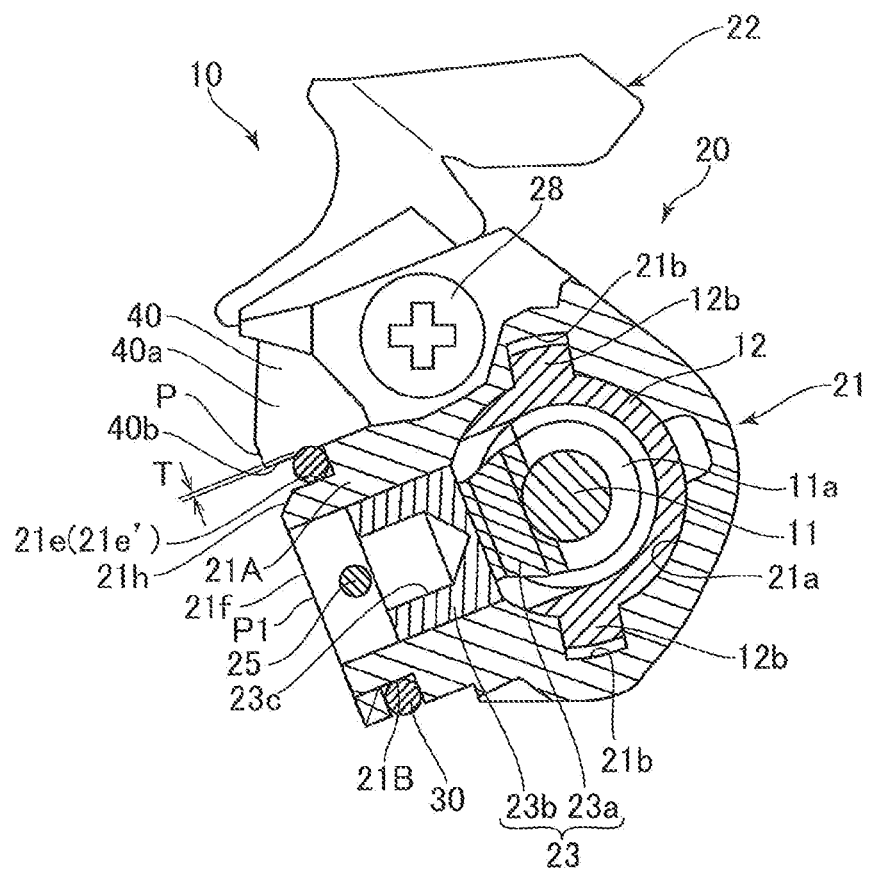
FIG. 3A is a partial cross-sectional view showing a configuration of the fishing line guide body portion of the present embodiment.

The holding portion 21 and the tubular body 12 are integrally turnable, and are engaged such that the holding portion 21 can reciprocate in the left-right direction along the tubular body 12. Specifically, as shown in FIG. 3A, the tubular body 12 is formed with protrusions 12b protruding in the radial direction at a plurality of places (preferably, two places in the diameter direction), and the holding portion 21 is formed with recesses 21b correspondingly so as to engage with the respective protrusions 12b. When these protrusions 12b and recesses 21b are engaged with each other, the holding portion 21 is integrally turnably driven with the tubular body 12, and as will be described later, can reciprocate in the left-right direction with respect to the tubular body 12. The forming numbers, the arrangement positions, and the shapes of the protrusions 12b and the recesses 21b can be appropriately changed.

The holding portion 21 comprises a cylindrical portion (configured in a cylindrical shape in the present embodiment) 21A that protrudes toward the front side and configures a front end portion of the level wind device 10, and an engagement pin 23 that engages with a spiral groove 11a formed in a surface of the screw shaft 11 is accommodated in the holding portion through a long hole 12a formed in the tubular body 12.

Figure 2:
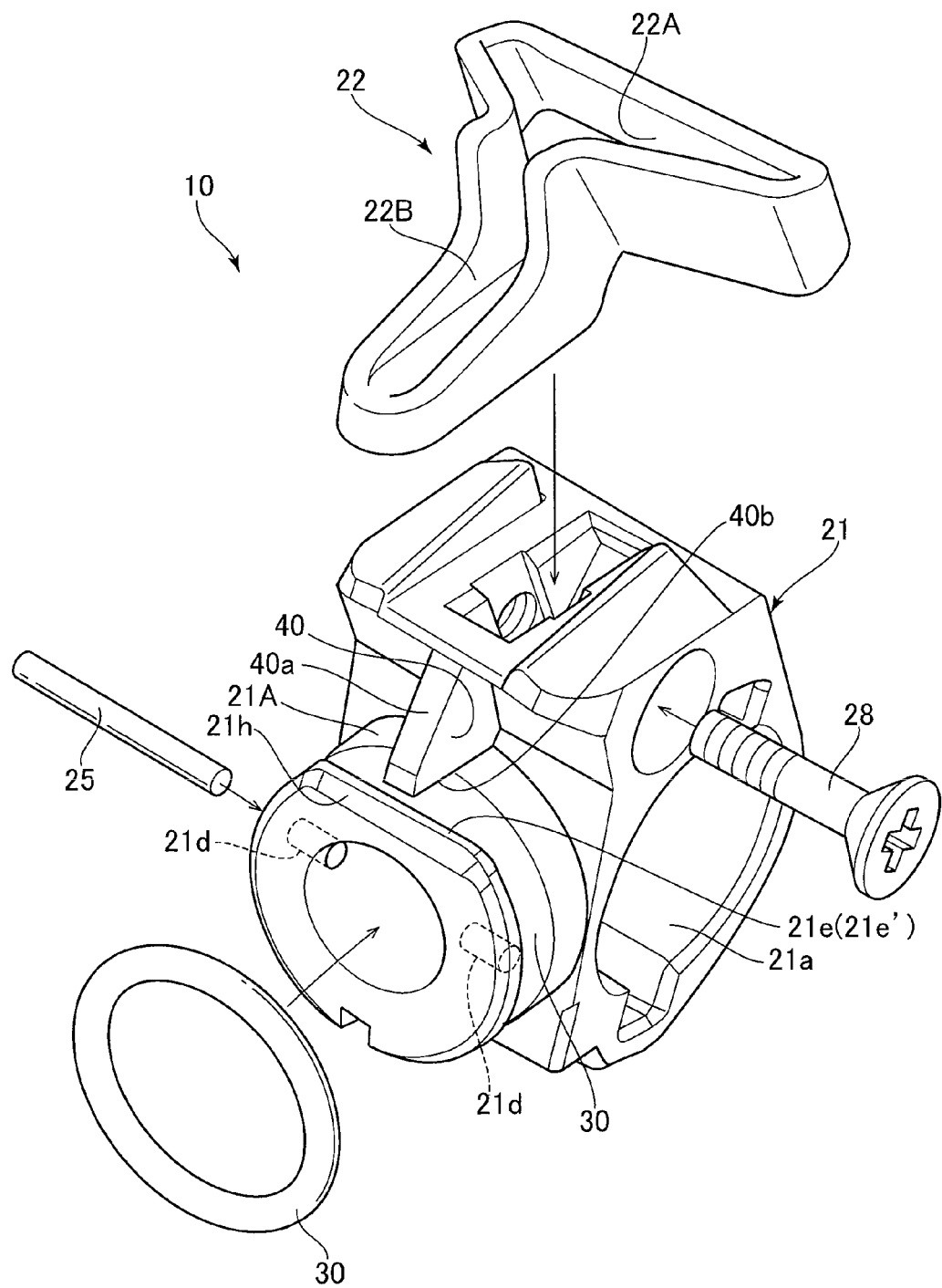
FIG. 2 is an exploded perspective view showing a structure of a fishing line guide body portion of the present embodiment.

The engagement pin 23 comprises an engagement portion 23a that engages with the spiral groove 11a and a main body 23b that is press-fitted into the cylindrical portion 21A. The engagement pin 23 is configured to be retained in a state of being press-fitted into the cylindrical portion 21A. As illustrated in FIG. 2, this retaining structure is configured by forming a through-hole 21d in the diameter direction of the cylindrical portion 21A, press-fitting the main body 23b of the engagement pin 23 into the cylindrical portion 21A, and press-fitting the retaining pin 25 in a state where the engagement portion 23a is engaged with the spiral groove 11a.

In the present embodiment, the weight of the engagement pin 23 is reduced by forming a cavity portion 23c in the main body 23b, but the main body 23b may be configured in a solid state.

Furthermore, an O-ring 30 is attached to the cylindrical portion 21A in correspondence with a press-fitting position of the retaining pin 25 so that the retaining pin 25 does not come out in the radial direction. A fixing groove 21B is formed in the cylindrical portion 21A along the circumferential direction, and the O-ring 30 is prevented from detaching from the cylindrical portion 21A by being fitted into the fixing groove 21B.

The fishing line inserting portion 22 is fixed to the upper surface side of the holding portion 21 by a locking bis 28 or the like. Similarly to Patent Literature 1 described above, the fishing line inserting portion 22 comprises an opening 22A in which an opening region is formed wide so as to reduce resistance at the time of releasing the fishing line, and a narrow portion 22B that guides the fishing line at the time of winding the fishing line, and is formed of a material having low fishing line resistance such as, for example, SUS or titanium.

When the clutch is set to the OFF state, the holding portion 21 is turned together with the tubular body 12, and the opening 22A is located in front of the spool 3 (fishing line releasing state), and when the clutch is set to the ON state, the holding portion 21 is turned in the opposite direction together with the tubular body 12, and the narrow portion 22B is located in front of the spool 3 (fishing line guiding state).

According to the level wind device 10 having the configuration described above, when the clutch is turned OFF at the time of the casting operation, the opening 22A in which an opening region is formed wide is located in front of the spool, and thus the released fishing line does not receive a large resistance from the inner surface of the opening 22A, and stable casting can be performed while suppressing a decrease in the flying distance of the tackle. When the clutch is returned to ON, the narrow portion 22B is located in front of the spool (see FIG. 1). When the handle 5 is wound in this state, the fishing line guide body 20 (the fishing line inserting portion 22) is reciprocally driven in the left-right direction by the engagement pin 23 engaged with the spiral groove 11a of the rotatably driven screw shaft 11, so that the fishing line is evenly wound around the spool 3.

In general, when a line trouble such as a backlash phenomenon occurs, the fishing line wound around the spool 3 may be looped or twisted, and line entanglement easily occurs. In particular, in the present embodiment, since the fishing line guide body 20 is turnably driven, a structure in which line entanglement easily occurs is adopted, and the fishing line guide body 20 is provided with a rib 40 so that such line entanglement is less likely to occur.

The rib 40 of the present embodiment has a plate shape and is integrally provided at the center of the holding portion 21 of the fishing line guide body 20.

Specifically, a cylindrical portion 21A that accommodates the engagement pin 23 to be engaged with the spiral groove 11a of the screw shaft 11 is formed so as to protrude toward the front side at the front part of the holding portion 21, and the fishing line easily enters the gap or the step portion in the upper region of the cylindrical portion 21A thus causing line entanglement. Therefore, the rib 40 is integrally formed at the front central portion of the holding portion 21 so as to protrude toward the front side so that the fishing line does not enter this portion.

Figure 3B:
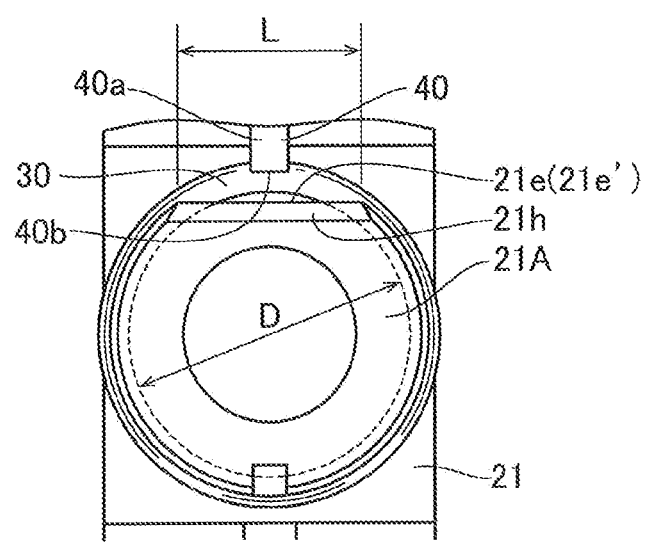
FIG. 3B is a front view.

The rib 40 is formed in a shape in which the fishing line that has caused the line trouble or the like easily comes off when coming into contact with the cylindrical portion 21A and the vicinity thereof (a shape in which the fishing line slides in a direction in which the fishing line comes off). When the rib is formed in a plate shape as in the present embodiment, as illustrated in FIGS. 2 and 3, the front end edge 40a is inclined so as to approach the central portion of the holding portion 21 as it transitions from the cylindrical portion 21A side to the upper side (the fishing line inserting portion 22 side), whereby the fishing line easily comes off upward.

Figure 4A:
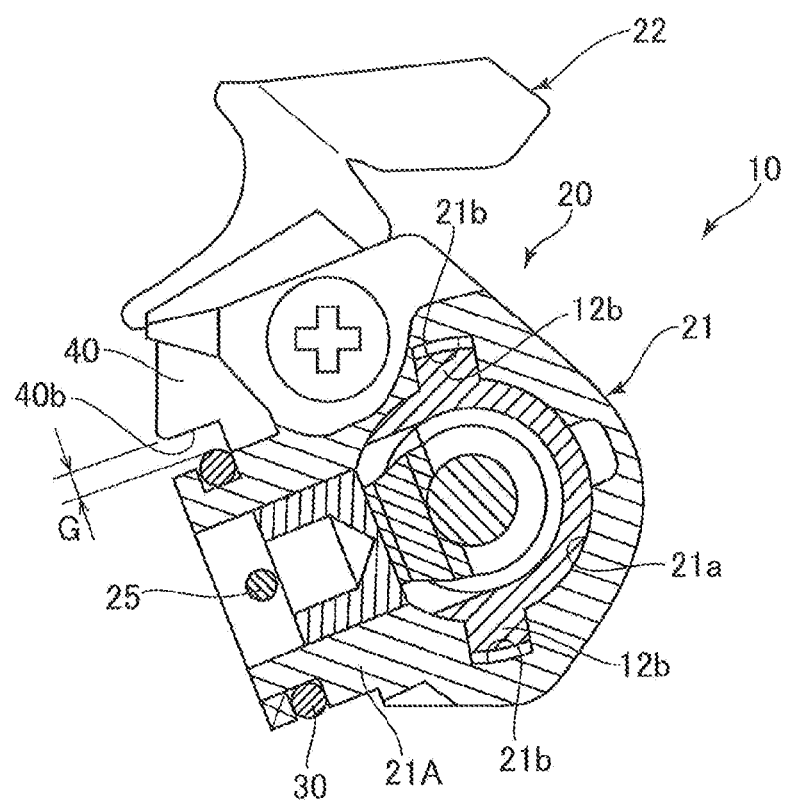
FIGS. 4A and 4B are partial cross-sectional views illustrating a fishing line guide body portion of a level wind device, where

Furthermore, in the present embodiment, the O-ring 30 is attached to the cylindrical portion 21A in correspondence with the press-fitting position of the retaining pin 25 so that the retaining pin 25 does not come off in the radial direction. If a gap (gap G) as illustrated in FIG. 4A is formed between the O-ring 30 and the lower surface 40b of the rib 40, the fishing line may enter the gap G and line entanglement may occur when a line trouble or the like occurs. Therefore, the O-ring 30 is configured to fill a gap between the lower surface 40b of the rib 40 of the cylindrical portion 21A and the opposing portion 21e opposing thereto in relation to the rib 40.

As for the configuration of filling the gap, it is sufficient that the fishing line does not enter between the O-ring 30 and the lower surface 40b of the rib 40. Specifically, even if the diameter of the fishing line to be used is small, the fishing line is prevented from entering if the gap T illustrated in FIG. 3A is smaller than or equal to 0.3 mm. In particular, when the O-ring 30 is in a state of coming into contact with the lower surface 40b of the rib 40 (including a crushed state: the interval T is 0 mm), the fishing line can be reliably prevented from entering.

In the present embodiment, as described above, the fixing groove 21B for press-fitting and fixing the O-ring 30 is formed in the cylindrical portion 21A along the circumferential direction, so that the O-ring 30 is less likely to detach from the cylindrical portion 21A.

The fixing groove 21B is not formed over the entire circumference of the cylindrical portion 21A, but is preferably formed excluding a region (opposing portion 21e) that becomes the opposing portion of the rib 40. As described above, since the groove is not formed in one part thereof, the fixing operation of the O-ring 30 can be easily performed, and the fishing line will not be caught since the fixing groove does not exist at a portion where the fishing line easily enters.

In addition, it is preferable that the opposing portion 21e in which the fixing groove is not formed is formed in a flat shape (the flat portion 21e' is formed), so that the fishing line is less likely to be caught and the O-ring 30 can be more easily fixed. In this case, with respect to the width W of the flat portion 21e' where the fixing groove is not formed, the O-ring 30 easily comes off if the width W is excessively large, and the O-ring 30 is difficult to be fitted if the width W is excessively small, and hence 0.45 D<W<0.65 D is preferable where D is the diameter of the cylindrical portion 21A (see FIG. 3B).

In addition, it is preferable that the rib 40 is formed in such a shape that the front end edge 40a thereof is at the same position (in the same plane) as the front end edge 21f of the cylindrical portion 21A or at a position on the back side thereof.

In the present embodiment, as shown in FIG. 3A, the rib 40 has an inclined shape that approaches the central portion of the holding portion 21 as the front end edge 40a transitions upward. In the rib having such a configuration, when the frontmost position is P, the front end edge 21f of the cylindrical portion 21A is formed to be on the back side of the frontmost position P1 (the cylindrical portion 21A is protruded toward the front side with respect to the front end edge 40a of the rib 40), so that the fishing line can easily come off even if the fishing line is about to be entangled (or entangled) in a loop shape at the cylindrical portion 21A. The protruding amount toward the front side of the cylindrical portion 21A with respect to the front end edge 40a of the rib 40 is preferably formed to be less than or equal to 0.3 mm so that the entangled fishing line easily and smoothly transitions to the front end edge 40a.

In addition, a chamfer 21h is preferably formed at the front end edge 21f of the cylindrical portion 21A so as to guide the fishing line to the front end edge 40a of the rib 40. With the formation of the chamfer 21h, even if the fishing line comes into contact with the portion of the O-ring 30 or the vicinity thereof, the fishing line is guided to the front end edge 40a side of the rib 40 and is smoothly detached.

Note that the chamfer 21h merely needs to exhibit a function of detaching the fishing line, and its width may be greater than or equal to 0.3 mm. In addition, if the width is too wide, the cylindrical portion 21A accommodating the engagement pin 23 becomes thin or thick, and the strength lowers, and thus the width is less than or equal to 1.0 mm and preferably less than or equal to 0.7 mm.

Next, a description will be made by comparing the fishing line guide body of the level wind device configured as described above and a conventional fishing line guide body with reference to FIGS. 4 to 7. In these drawings, (a)

illustrates a conventional structure, and (b) illustrates a structure of the present embodiment. In addition, the same reference numerals are denoted for the reference numerals.

Figure 4B:
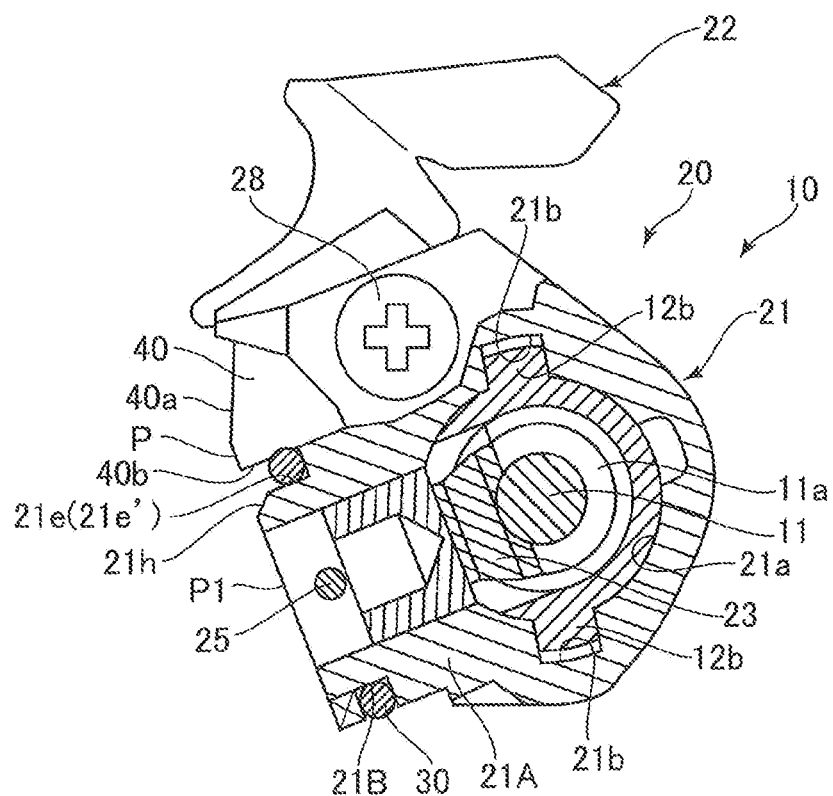
Figure 5A:
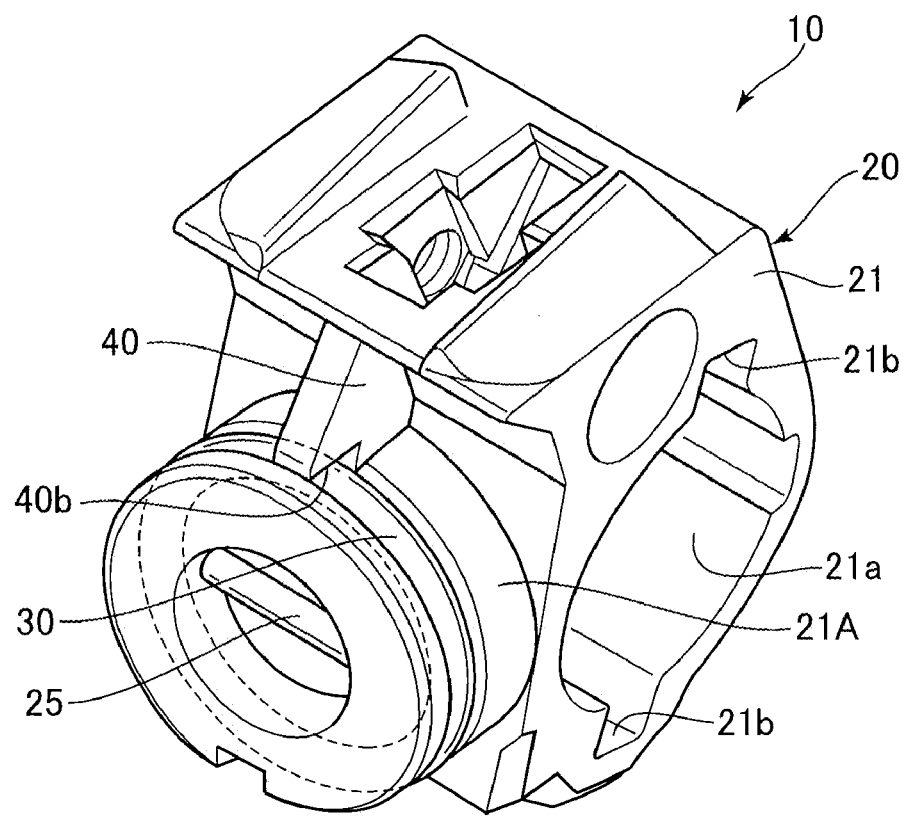
FIGS. 5A and 5B are perspective views illustrating a fishing line guide body portion, where
Figure 5B:
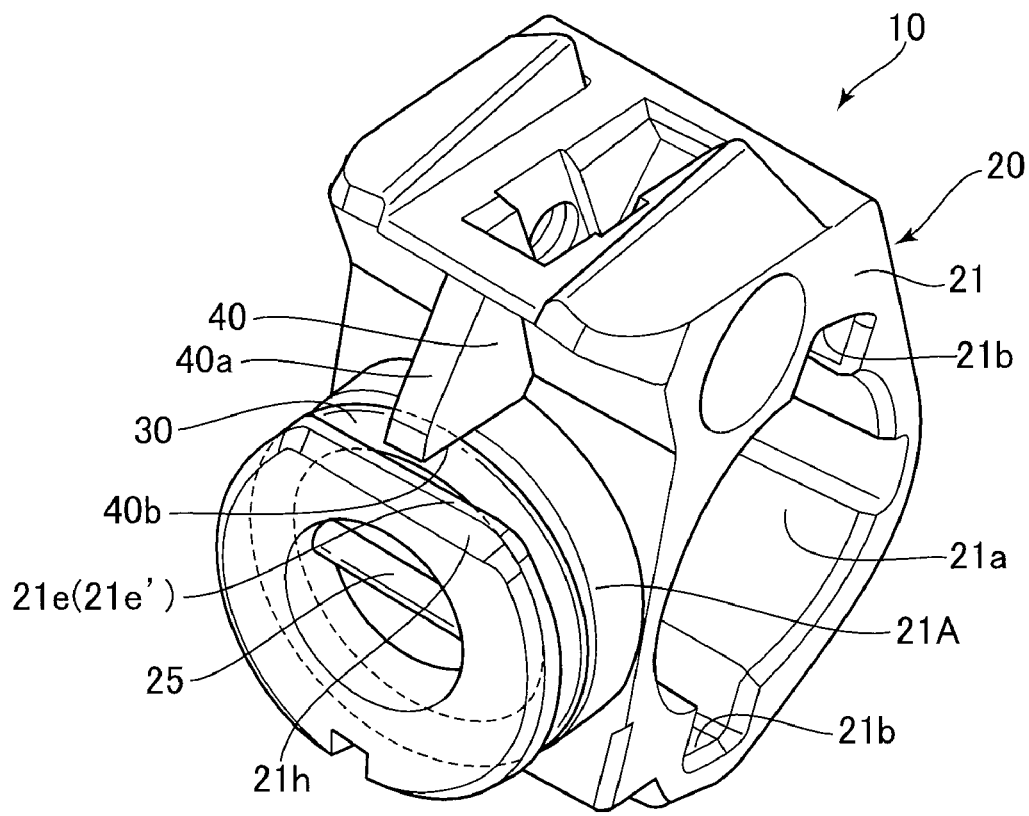
Figure 6A:
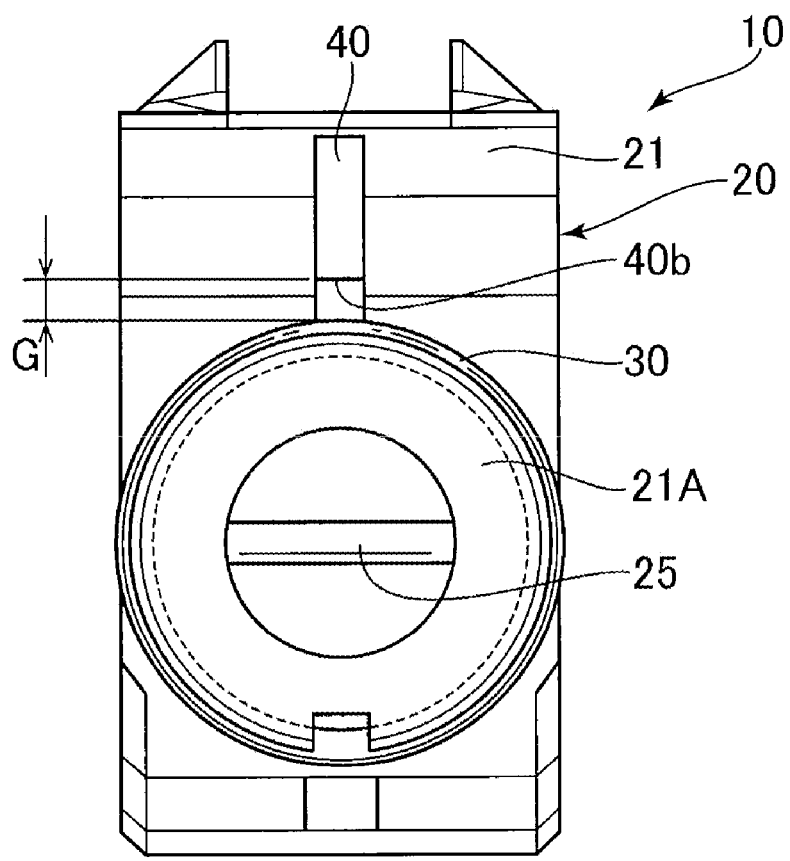
FIGS. 6A and 6B are front views illustrating a fishing line guide body portion, where
Figure 6B:
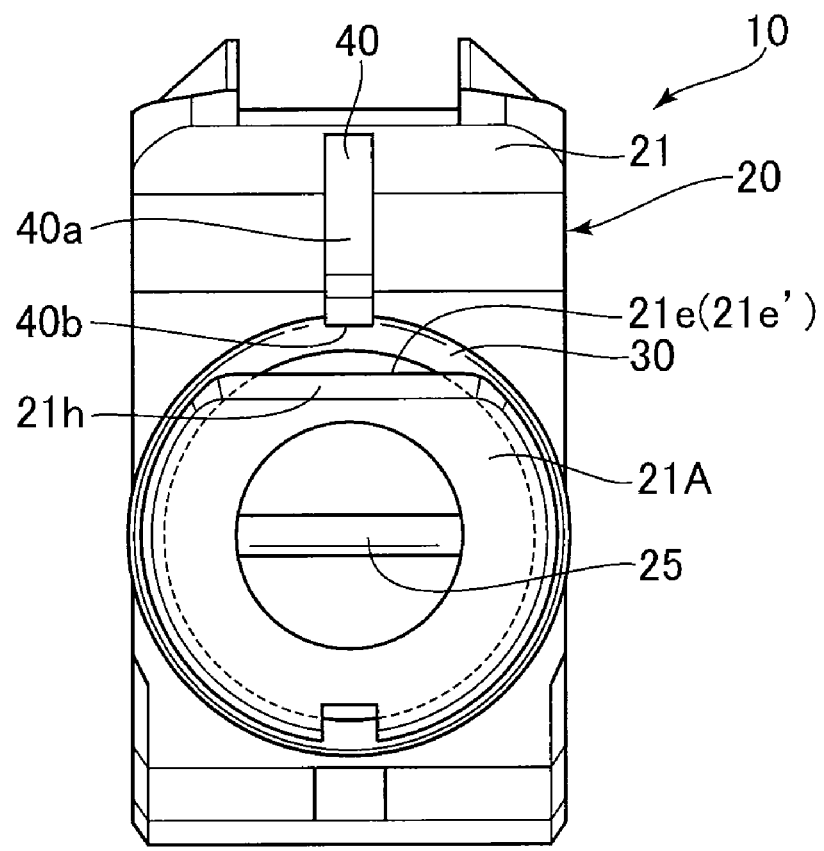
Figure 7A:
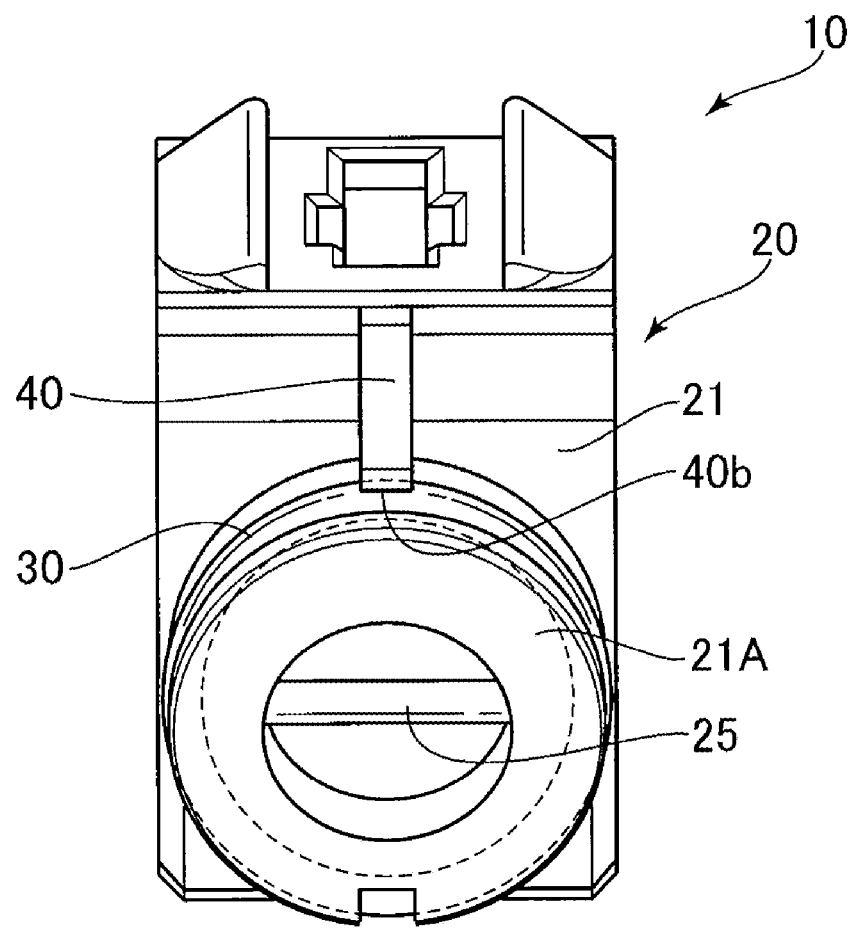
FIGS. 7A and 7B are views illustrating a fishing line guide body portion as viewed from the upper front side, where
Figure 7B:
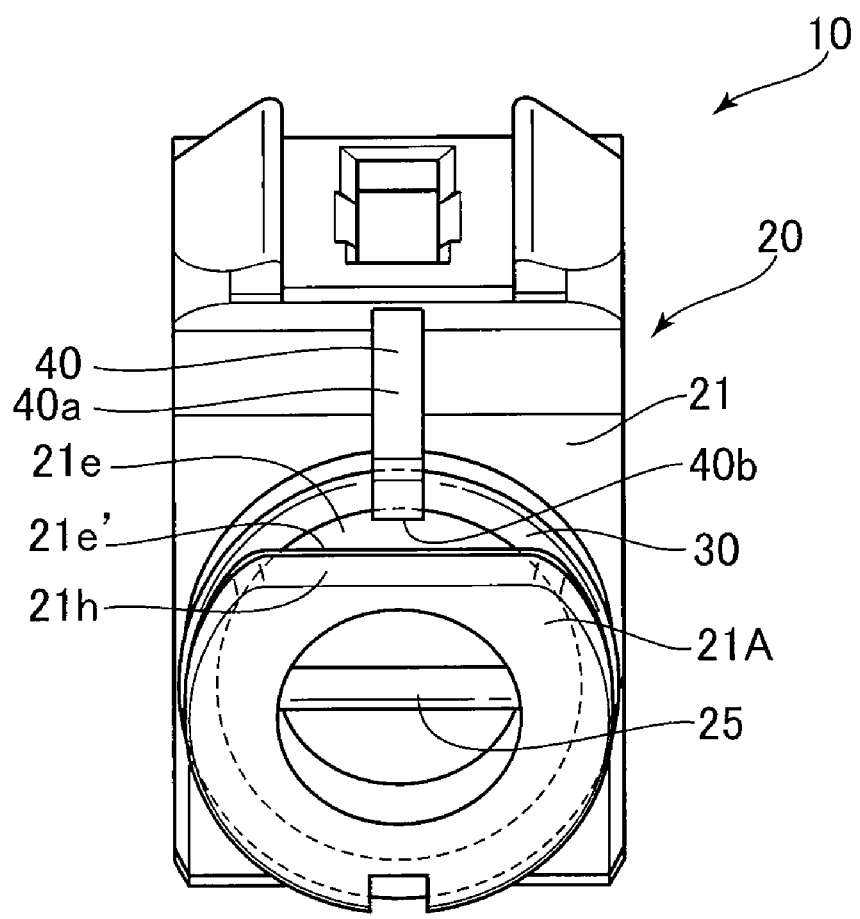

In the present embodiment, as illustrated in FIG. 4B, the O-ring 30 is disposed so as to fill the gap between the lower surface 40b of the rib 40 of the cylindrical portion 21A and the opposing portion 21e opposing thereto in the relationship with the rib 40 without forming the gap G as illustrated in FIG. 4A between the O-ring 30 attached to the cylindrical portion 21A and the lower surface 40b of the rib 40. Therefore, even if a line trouble or the like occurs at the time of casting or the like, the fishing line does not enter deeper than the O-ring, and line entanglement is prevented. In addition, since the fishing line that has not entered comes off from the upper side by the inclined surface of the front end edge 40a of the rib 40, a level wind device having a structure in which line entanglement is less likely to occur is obtained at the periphery of the rib 40 provided in the fishing line guide body 20.

In addition, even if the fishing line tries to come into contact with the O-ring 30 portion, in the present embodiment, the fishing line is not caught at the edge portion of the fixing groove 21B or between the O-ring 30 and the edge portion of the fixing groove 21B since the O-ring fixing groove 21B is not formed in the region (opposing portion 21e) that is the opposing portion at the periphery of the rib 40 where the fishing line is likely to be entangled easily. Furthermore, since the fixing groove 21B is not formed at one part, the fixing operation of the O-ring 30 can be easily performed.

Furthermore, even if the fishing line tries to enter the portion of the O-ring 30, the fishing line is not caught and can be smoothly removed by forming the chamfer 21h.

The embodiments according to the present disclosure have been described above, but the present disclosure is not limited to the embodiments and may be modified in various ways.

The present disclosure has features in the portion of the fishing line guide body 20 of the level wind device 10, and other configurations, for example, the size and shape of the reel main body, other functional members, and the like are not particularly limited. In addition, the fishing line guide body 20 is configured to turn together with the operation of the clutch, but the fishing line guide body may be configured to merely reciprocate to the left and right and not to be turned. Furthermore, the configuration of the fishing line inserting portion 22, the holding structure of the engagement pin engaged with the screw shaft, and the like can also be appropriately modified.

Furthermore, as for the shape of the rib 40 that prevents line entanglement, the shape, arrangement position, constituent material, and the like of the rib can be appropriately changed by curving the front end edge 40a, changing the wall thickness, or the like as long as a configuration in which the fishing line is not easily caught is realized.

What is claimed is:

1. A fishing reel comprising a level wind device that evenly winds a fishing line around a spool rotatably supported between left and right side plates of a reel main body; wherein
    the level wind device comprises a fishing line guide body through which a fishing line is inserted and a rib that is provided in the fishing line guide body and prevents line entanglement;
    an O-ring is disposed at a front end portion of the level wind device so as to fill a gap between the rib and an opposing portion opposing the rib at the front end portion; and
    the rib has a shape that slides the fishing line brought into contact with the front end portion, wherein
    the O-ring is in contact with the rib.

2. The fishing reel according to claim 1, wherein a fixing groove into which the O-ring is fitted is formed in the front end portion separate from the opposing portion.

3. The fishing reel according to claim 2, wherein the opposing portion is flat.

4. The fishing reel according to claim 3, wherein the O-ring fitted in the fixing groove is fixed in a state of being in contact with a lower surface of the rib at the flat opposing portion.

5. The fishing reel according to claim 1, wherein the rib is formed in such a shape that a front end edge is located at the same position as or behind a front end edge of a front end portion of the level wind device.

6. The fishing reel according to claim 5, wherein the front end edge of the front end portion of the level wind device is formed with a chamfer for guiding a fishing line to the front end edge of the rib.

7. The fishing reel according to claim 1, wherein a front end edge of a front end portion of the level wind device is formed with a chamfer for guiding a fishing line to a front end edge of the rib.

* * * * *